United States Patent Office 3,551,411
Patented Dec. 29, 1970

3,551,411
2,5-BENZODIAZONINE COMPOUNDS
William J. Houlihan, Mountain Lakes, and Robert E. Manning, Parsippany, N.J., assignors to Sandoz-Wander, Inc., Hanover, N.J., a corporation of Delaware
No Drawing. Filed Mar. 17, 1967, Ser. No. 623,850
Int. Cl. C01d 53/00, 57/04
U.S. Cl. 260—239                                  2 Claims

ABSTRACT OF THE DISCLOSURE

This invention relates to nitrogeneous heterocyclic compounds which are useful as anti-depressants. The compounds are of three classes, i.e., (A) 4 - loweralkyl - 2-oxa - 1,2,3,5,6,10b - hexahydoimidazo [2,1 - a] isoquinolinium halides, e.g., 8,9 - dimethoxy - 4 - methyl - 1,2,3,5,6,10b - hexahydroimidazo[2,1-a]isoquinolinium iodide; (B) 5 - loweralkyl - 2,5 - benzodiazonin - 3 - ones, e.g., 9,10 - dimethoxy - 5 - methyl - 2,5-benzodiazonin - 3 - one; and (C) 5 - loweralkyl - 2,5 - diazonines, e.g., 9,10-dimethoxy - 5 methyl - 2,5 - benzodiazonine bimaleate. Compounds (A) may be obtained by treating a 1,2,3,5,6,10b - hexahydroimidazo[2,1-a]isoquinolin - 2 - one with a lower alkyl halide, e.g., methyl iodide. Compounds (B) may be obtained by reducing compounds (A) with sodium in liquid ammonia. Compounds (C) may be obtained by reducing compounds (B) with lithium aluminum hydride.

This invention relates to compounds of the formulae:

(A)

[structure with $R^1$, $R^2$, $R^3$, $X^\ominus$, HN—=O]

wherein $R^1$, $R^2$, $R^3$ and X are as defined below:

(B)

[structure with $R^1$, $R^2$, $R^3$, N–H, =O]

wherein $R^1$, $R^2$ and $R^3$ are as defined below:

(C)

[structure with $R^1$, $R^2$, $R^3$, N–H]

wherein each of $R^1$ and $R^2$ is, independently, either a hydrogen atom, linear alkyl having from 1 to 4 carbon atoms, or linear alkoxy having from 1 to 4 carbon atoms; alternatively, $R^1$ and $R^2$ are joined to form methylenedioxy (—O—CH$_2$—O—);

$R^3$ is linear having from 1 to 4 carbon atoms; and
X is a halogen, e.g., —Cl, —Br and —I;
and pharmaceutically acceptable avid acid addition salts of compounds (C).

The compounds of this invention may be prepared by the following reaction scheme: $R^1$, $R^2$, $R^3$ and X being as defined above.

Step (a)

[structure transformation via $R^3X$ to compound (A)]

Step (b)

(A) →(Reduction, e.g. Na in NH$_3$)→ (B)

Step (c)

(B) →(Reduction, e.g. LAH)→ (C)

According to the reaction scheme:
Step (a) is a conversion of a 2-oxa-1,2,3,5,6,10b-hexahydroimidazo[2,1a]isoquinolin-2-one by reaction with $R^3X$, i.e., lower alkyl halide, e.g. CH$_3$I, to form the quaternary ammonium halide, i.e., a compound (A). 2 - oxa - 1,2,3,5,6,10b - hexahydroimidazo[2,1a]isoquinolin-2-ones may be obtained by following the procedure disclosed by D. Beke and L. Toke in Chim. Berichte, vol. 95, pp. 2122–2131, (1962).

Step (b) is a reduction of compound (A) to compound (B), effected by use of sodium in liquid ammonia resulting in the cleavage of the nitrogen-to-carbon bond common to the 6-membered nitrorgen-containing ring and the 5-membered lactam ring, thus forming a 9-membered lactam ring containing two nitrogen atoms.

Step (c) is a reduction of compound (B), i.e., the lactam, to compound (C), effected by use of an agent suitable for the reduction of a carbonyl group, e.g., heating with lithium aluminum hydride (LAH) in a suitable solvent, e.g., diethylether (ether).

The pharmaceutically acceptable acid addition salts of compounds (C) are prepared from the corresponding free base [compounds of Formula C] according to art-recognized procedures well-known to the art-skilled. Among the pharmaceutically acceptable acid addition salts are salts of organic acids, e.g. tartaric acid; inorganic acids, e.g. hydrochloric acid, hydrobromic acid and sulfuric acid; monobasic acids, e.g. an alkanesulfonic acid, such as methanesulfonic acid (H$_3$C—SO$_3$H); dibasic acids, e.g. succinic acid; tribasic acids, e.g. phosphoric acid and citric acid;

saturated acids, e.g. acetic acid; ethylenically unsaturated acids, e.g. maleic acid and fumaric acid; and aromatic acids, e.g. salicylic acid and arylsulfonic acids, such as benzenesulfonic acid. The only limitation on the acid selected is that the resulting acid addition salt is pharmaceutically acceptable; the acid does not nullify the therapeutic properties of the free base.

Compounds (C) and the pharmaceutically acceptable acid salts of compounds (C) are useful as antidepressants, analgesics and antiinflammatories. They are administered to mammals either orally or parenterally in standard dosage forms, e.g. tablets and capsules, in daily doses of from 10 to 40 mg./kg. Although administration is preferred in equally divided doses from 2 to 4 times per diem, each of said compounds may also be administered in a single daily dose.

Each of the pharmaceutically active compounds of this invention may be, e.g., incorporated, for oral administration, in a tablet as the sole active ingredient. A typical tablet is constituted by from 1 to 3 percent binder, e.g. tragacanth; from 3 to 10 percent disintegrating agent; e.g. corn starch; from 2 to 10 percent lubricant, e.g. talcum; from 0.25 to 1.0 percent lubricant, e.g. magnesium stearate; an average dosage of active ingredient; and q.s. 100 percent of filler, e.g. lactose; all percentages being by weight. Tablets are prepared according to standard tabletting techniques, which are well-known in the art, employing the necessary amounts of conventional granulating liquids, e.g. alcohol SD–30 and purified water. An exemplary tabletting formulation for the instant active compounds is:

|  | Parts |
|---|---|
| Title compound of Example 3 | 85 |
| Tragacanth | 2 |
| Lactose | 4.5 |
| Corn starch | 5 |
| Talcum | 3 |
| Magnesium stearate | 0.5 |
| Alcohol SD–30 } | q.s. |
| Purified water } |  |

In the following examples all temperatures are in degrees centigrade. Parts and percentages are by weight unless otherwise specified. The relationship between parts by weight and parts by volume is the same as that between the kilogram and the liter.

EXAMPLE 1

8,9-dimethoxy-4-methyl-1,2,3,5,6,10b-hexahydroimidazo[2,1-a]isoquinolinium iodide

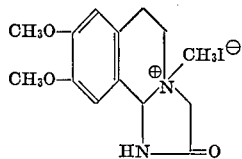

This example illustrates the preparation of compounds (A). Compounds (A) may be used in the preparation of compounds (B) as is illustrated in Example 2.

A solution of 1 part of 8,9-dimethoxy-1,2,3,5,6,10b-hexahydroimidazo[2,1-a]isoquinolin-2-one in 5 parts by volume of ethanol and 5 parts by volume of methyl iodide is allowed to stand for 16 hours. The resulting precipitate is collected by filtration yielding 1.1 parts of crude product which is then recrystallized from water yielding 0.5 part of the title compound.

Replacing the 8,9 - dimethoxy - 1,2,3,5,6,10b - hexahydroimidazo[2,1-a]isoquinolin-2-one, i.e., a compound wherein $R^1$ and $R^2$ are lower alkoxy with an equivalent amount of 8,9 - dimethyl - 1,2,3,5,6,10b-hexahydroimidazo[2,1-a]-isoquinolin - 2 - one, i.e., a compound wherein $R^1$ and $R^2$ are lower alkyl, or 8,9-methylenedioxy-1,2,3,5,6,10b-hexahydroimidazo[2,1-a]isoquinolin - 2 - one, results in the preparation, in a similar manner, of the corresponding compounds (A). Likewise, use of ethyl iodide in place of the methyl iodide gives the corresponding compound (A).

EXAMPLE 2

9,10-dimethoxy-5-methyl-2,5-benzodiazonin-3-one hydrochloride

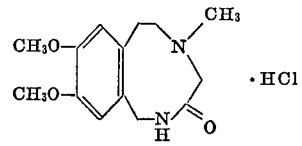

This example illustrates the preparation of compounds (B). Compounds (B) may be used in the preparation of compounds (C), as illustrated in Example 3.

1.2 parts of sodium is added to a stirred suspension of 5 parts of 8,9-dimethoxy-4-methyl-1,2,3,5,6,10b-hexahydroimidazo[2,1-a]isoquinolinium iodide in 100 parts by volume of liquid ammonia cooled in a Dry Ice-acetone bath. The reaction mixture is stirred for one hour and then allowed to evaporate over a period of 16 hours. The resulting residue is dissolved in a mixture of methanol, water and ether; the ether layer is then separated and dried over sodium sulfate and then evaporated. The residue is converted to the hydrochloride salt and is crystallized from ethanol, yielding 2.2 parts of the title compound, M.P. 252° to 253° C.

Replacing the 8,9 - dimethoxy-4-methyl-1,2,3,5,6,10b-hexahydroimidazo[2,1 - a]isoquinolinium iodide, i.e., a compound (A) wherein $R^1$ and $R^2$ are alkoxy groups, with an equivalent of 8-methyl-9-propoxy-4-methyl-1,2,3,5,6,10b-hexahydroimidazo[2,1-a]isoquinolinium iodide, i.e. a compound (A) wherein $R^1$ is lower alkyl and $R^2$ is lower alkoxy, results in the preparation of the corresponding compound (B) in similar manner.

EXAMPLE 3

9,10-dimethoxy-5-methyl-2,5-benzodiazonine bimaleate

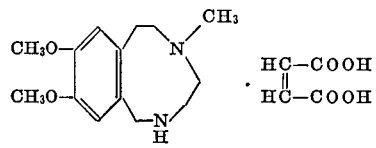

This example illustrates the preparation of compounds (C).

A solution of 6 parts of compound (B) in 30 parts by volume of THF (tetrahydrofurane) is added to a solution of 3 parts of LAH in 200 parts by volume of ether and the mixture heated under reflux for 16 hours. The reaction mixture is then decomposed by the addition of water and filtered through celite (diatomaceous earth). The organic phase is separated and evaporated under vacuum. The residue is converted to the maleate salt which is then crystallized from ethanol-ether yielding 5.4 parts of compound (C), M.P. 154° to 158° C.

Replacing the 8,9 - dimethoxy - 5 - methyl - 2,5 - benzodiazonin-3-one, a compound (B) wherein $R^1$ and $R^2$ are lower alkoxy groups, with 8 - methoxy - 5 - methyl - 2,5-benzodiazonin-3-one, a compound (B) wherein $R^1$ is lower alkoxy and $R^2$ is a hydrogen atom, results in the preparation, in a similar manner, of the corresponding compound (C).

It is thought that the invention and its advantages will be understood from the foregoing description. It is apparent that various changes may be made in the structures of the compounds without departing from the spirit and scope of the invention or sacrificing its material advantages. The examples merely provide illustrative embodiments.

What is claimed is:
1. A compound of the formula

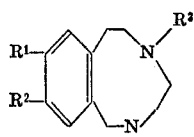

and a pharmaceutically acceptable acid addition salt thereof—
wherein
$R^1$ is a member selected from the group consisting of a hydrogen atom, straight chain alkyl having from 1 to 4 carbon atoms, straight chain alkoxy having from 1 to 4 carbon atoms, and, together with $R^2$, methylenedioxy;
$R^2$ is a member selected from the group consisting of a hydrogen atom, straight chain alkyl having from 1 to 4 carbon atoms, straight chain alkoxy having from 1 to 4 carbon atoms and, together with $R^1$, methylenedioxy; and
$R^3$ is a member selected from the group consisting of methyl, ethyl, propyl and butyl 2. The compound according to claim 1 wherein each of $R^1$ and $R^2$ is methoxy and $R^3$ is methyl.

References Cited

Beke et al.: Ber. Deut. Chem., vol. 95, pp. 2122–2131 (1962).

ALTON D. ROLLINS, Primary Examiner

U.S. Cl. X.R.

260—239.3, 286, 287, 340.5; 424—244